United States Patent

Goodman

[15] 3,652,957

[45] Mar. 28, 1972

[54] ADAPTIVE DELTA MODULATOR

[72] Inventor: David Joel Goodman, Chatham, N.J.

[73] Assignee: Bell Telephone Laboratories, Incorporated, Murray Hill, N.J.

[22] Filed: Dec. 16, 1970

[21] Appl. No.: 98,693

[52] U.S. Cl. ........................332/11 D, 179/15 AP, 325/38 B

[51] Int. Cl. ........................H03k 13/22

[58] Field of Search ............332/11 R, 11 D; 325/38 R, 38 A, 325/38 B; 179/15 AP

[56] References Cited

UNITED STATES PATENTS

| | | | |
|---|---|---|---|
| 3,273,141 | 9/1966 | Hackett | 325/38 B X |
| 3,354,267 | 11/1967 | Crater | 179/15 AP |
| 3,452,297 | 6/1969 | Kelley et al. | 332/11 X |
| 3,526,855 | 9/1970 | McDonald | 332/11 D |
| 3,500,441 | 3/1970 | Brolin | 332/11 D X |

*Primary Examiner*—Alfred L. Brody
*Attorney*—R. J. Guenther and E. W. Adams, Jr.

[57] ABSTRACT

Analog signals are converted in a fixed step size, high-speed linear delta modulator, and the linear delta modulator signals are accumulated in an up-down counter, or the like. The counter output is conveyed to one terminal of the digital adder of a digital delta modulator. The other adder terminal receives signals from an accumulator connected in the feedback loop of the digital delta modulator. Sequential logic responsive to the adaptive delta modulator output digitally varies the count of the accumulator.

7 Claims, 5 Drawing Figures

INVENTOR
D. J. GOODMAN
BY David D. Dubosky
ATTORNEY

FIG. 4
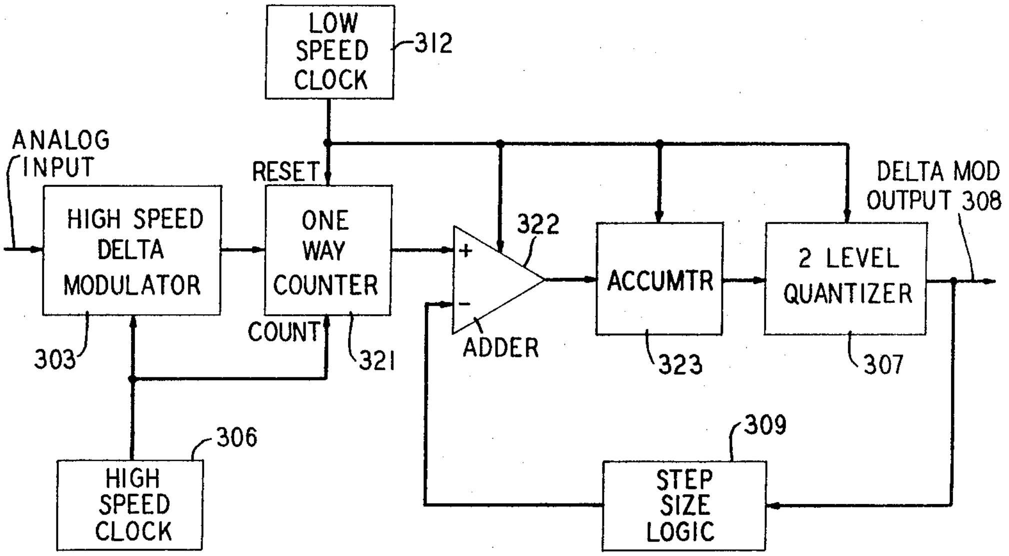
FIG. 3A
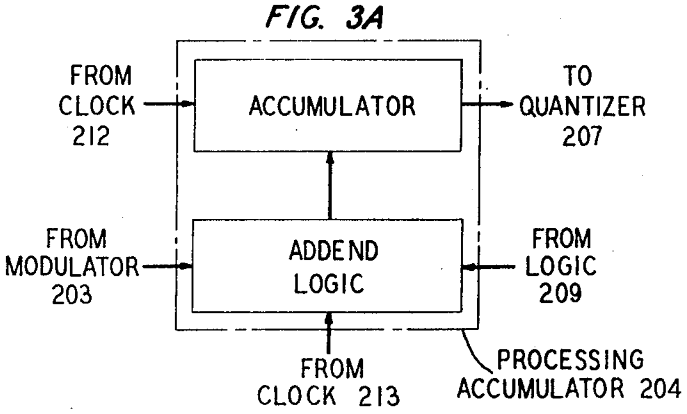
FIG. 3B
| LOW SPEED CLOCK 213 | LINEAR DELTA MOD. 203 | PREVIOUS OUTPUT DIGIT ON 208 | ADDEND LOGIC TO ACCUMULATOR |
|---|---|---|---|
| NO PULSE | 0 | 0 OR 1 | +1 |
| NO PULSE | 1 | 0 OR 1 | -1 |
| PULSE | 0 | 0 | -S-1 |
| PULSE | 0 | 1 | S-1 |
| PULSE | 1 | 0 | -S+1 |
| PULSE | 1 | 1 | S+1 |

ADAPTIVE DELTA MODULATOR

BACKGROUND OF THE INVENTION

This invention relates to digital transmission systems. More particularly, it relates to adaptive (companded) delta modulation systems.

A delta modulator is one which encodes analog signals by periodically encoding the change in an analog signal as a series of binary pulses. For example, if the analog signal is greater than a locally generated approximation, a "1" is transmitted, and if the signal is less than the locally generated approximation, a "0" is transmitted. A typical simple "linear" delta modulator consists of an integrator, a comparator which compares the analog signal with the output of the integrator, and a two-level quantizer which periodically encodes the results of the comparison as "1's" and "0's." The integrator operates upon the digital output from the quantizer to produce a reconstruction or approximation of the analog signal.

Obviously, the effectiveness of a delta modulator in representing analog signals depends to a large degree upon the accuracy of the locally generated approximation signal which is produced by the integrator. Accuracy is particularly enhanced by keeping the integrator step size small and the sampling rate high. Thus, notwithstanding the practical limitations upon speed and step size which may impose unwanted quantizing noise constraints upon delta modulator performance, the ultimate structural and economic simplicity of delta modulators often renders delta modulation a superior choice over multilevel quantizers, such as pulse code modulators (PCM).

The operation of linear delta modulators is characterized by a compromise between two functional problems. First, it is apparent that a delta modulator with a large step size will be able to track large changes in the analog signal. However, large step sizes will result in a poor signal-to-noise ratio during portions of the signal with relatively small, rapid changes. Accordingly, a small step size is desirable to reduce quantizing noise during these periods of small, rapid change. This tracking versus quantizing noise problem must be solved within the functional constraints which are always placed upon frequency bandwidth.

One method of solving the tracking versus quantizing noise reduction dilemma has been proposed by H. S. McDonald in U. S. Pat. No. 3,526,855. Mr. McDonald converts a high-speed single step size delta modulated signal into a multilevel representation thereof by passing the delta modulated signal to a digital register. The McDonald system, however, has not proven adequate with regard to its bandwidth capabilities.

Another solution to the tracking versus quantizing noise reduction problem in delta modulators has been the introduction of adaptive, or companded, delta modulators. Typically, adaptive delta modulators feature comparator and quantizer units similar to the linear delta modulators. In addition, however, adaptive delta modulators feature sequential logic which is responsive either to the input or to the output signals of the modulator, and which controls the operational step size of an integrator. The sequential logic, operating in accordance with a predetermined algorithm, allows the modulator to vary its integration step size in proportion to the rate of change of the signal to be encoded, thereby allowing for extensive improvements in the accuracy of the modulation. U.S. Pat. No. 3,500,441 to S. J. Brolin shows an adaptive delta modulator which varies the integration step size in direct response to changes in the analog signal. Other adaptive delta modulators feature a variable step size integrator which is responsive to certain digit combinations and patterns at the output of the integrator.

Although the variable step size mechanism in a sense transforms the delta modulation from a binary to a multilevel device, implementation is likely to be more economical than that of a conventional multilevel quantizer (such as PCM). However, since the prior art adaptive delta modulators rely upon changing the step size of an integrator, they must necessarily maintain very close and accurate supervision over the step size. That is, if the integration step sizes are permitted to vary more than a small amount, the functional advantages of adaptive delta modulation over simple linear delta modulation are extensively diminished. Moreover, the addition of circuitry for precise control of integration voltages and step sizes may well reduce the economic advantage of adaptive delta modulation over PCM and the like.

SUMMARY OF THE INVENTION

Accordingly, it is a primary object of the present invention to provide variable step size delta modulation without constraints upon integration step sizes.

It is a further object of the present invention to provide an adaptive delta modulator which shows substantial economy of apparatus over conventional multilevel quantizers, such as PCM, while maintaining performance standards which are at least as high as those of PCM.

The present invention is a variable step size delta modulator, the operation of which is substantially independent of integration step size. This independence is achieved by performing the adaptive delta modulation in an essentially digital manner.

The present invention is grounded upon the observation that it is the transmission rate, rather than the analog-to-digital conversion rate, which influences the overall cost of a communication system. Accordingly, the present invention utilizes a separation of the analog-to-digital conversion function from the encoding for transmission function, thereby obtaining a compromise between the goals of economy of implementation and efficiency of operation.

Thus, embodiments of the present invention operate by first converting the analog signal to a digital representation at a rate much higher than the anticipated transmission rate, and secondly, by utilizing a logical processor to simulate the adaptive encoding process at the transmission rate.

In an illustrative embodiment of the present invention an analog signal is first converted by means of a single step size high-speed "linear" delta modulator. Due to its high modulation speed and small uniform step size, this initial delta modulation tracks the analog signal in a very accurate manner. In particular, this modulation rate is chosen to be a multiple of the final overall delta modulation output rate. The output signal from the high-speed delta modulator is transmitted to some conversion means by which the train of ones and zeros from the delta modulation is periodically represented as a binary number. This binary number is then conveyed to a second, digital delta modulator which provides a digital simulation of the adaptive companding process. This digital delta modulator features a digital accumulator in its feedback loop. Sequential logic responsible to the output of the digital delta modulator controls the counting progression of the accumulator, thereby digitally simulating the analog variable step size procedure in conventional delta modulators.

The present invention will be more clearly understood when the following detailed description is considered in conjunction with the drawings.

BRIEF DESCRIPTION OF THE DRAWINGS

FIG. 3A shows in detail a portion of the embodiment of FIG. 2;

FIG. 3B shows a state table associated with FIG. 3A; and

FIG. 4 shows a third illustrative embodiment of the present invention.

DETAILED DESCRIPTION

Figure 1:
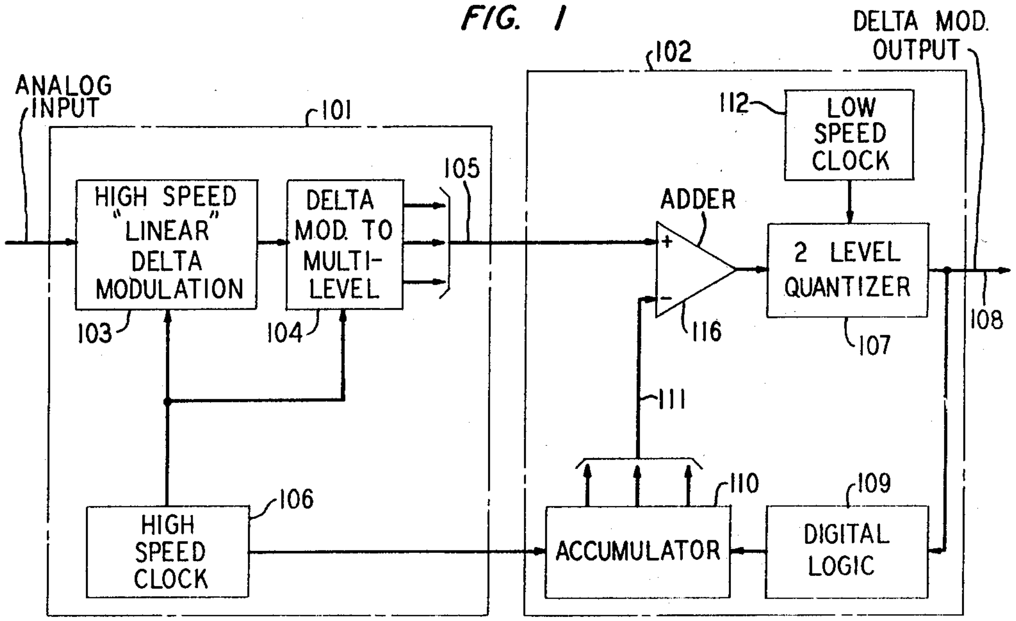
FIG. 1 shows a first illustrative embodiment of the present invention.

FIG. 1, which shows a first illustrative embodiment of the present invention, may be broadly divided into two parts. The first part 101, which is similar to the apparatus of McDonald, accomplishes a high-speed, accurate analog-to-digital conversion. The second part 102 accomplishes a digital simulation of the adaptive delta modulation process, producing output signals at the desired transmission rate.

Analog input signals for conversion are first introduced to a high-speed linear delta modulator 103. The linear delta modulator 103 is of the standard delta modulation format, including an integrator which operates with a single relatively small step size. The train of ones and zeros from the linear delta modulator 103 is coupled to a delta modulation to multilevel converter 104. For example, the converter 104 may be variously embodied as an accumulator, an up-down counter, or the like. The important function of the converter 104 is to produce at its output 105 a multidigit binary (i.e. multilevel) representation of the signal from the delta modulator 103.

Both the modulator 103 and the converter 104 operate under control of a high-speed clock 106. It is the high-speed clock 106 which regulates the rate of this first analog-to-digital conversion and which is preferably operating at a rate which is a multiple of the desired output rate of the embodiment of FIG. 1.

The multilevel representation at the converter output 105 is conveyed to the positive input of an adder 116, the output of which is connected to a two-level quantizer 107. The output 108 of the two-level quantizer 107 is in fact the output terminal for the embodiment of FIG. 1. Moreover, digital logic 109 which operates in response to the signals at output terminal 108 controls the counting sequence of an accumulator 110, the output 111 of which is connected to the negative input of the adder 116. The accumulator 110 is connected to the high-speed clock 106, and may therefore count as rapidly as $1/\tau$ counts per second. The accumulator 110 may be simply built using techniques shown by Jackson, Kaiser, and McDonald in "An Approach to the Implementation of Digital Filters," *IEEE Transactions on Audio and Electroacoustics*, Vol. AU–16, No. 3, September 1968. An output low speed clock 112 controls the operating rate of the two-level quantizer 107 thereby specifying the output rate for the embodiment of FIG. 1. The speed of clock 112 is preferably adjusted to be fractionally related to the operating rate of clock 106.

The operation of the embodiment of FIG. 1 proceeds as follows. If the high-speed clock 106 is defined as producing a pulse every $\tau$ seconds, the high-speed delta modulator 103 produces a binary digit at a rate of $1/\tau$ digits per second. As previously mentioned, each of these digits from the high-speed delta modulator 103 represents the difference from the analog signal of a locally generated approximation thereof. Thus, with each output digit from the modulator 103, the delta modulation-to-binary converter 104 changes its binary output number every $\tau$ seconds. Accordingly, a new binary number at terminal 105 is available to added 116 every $\tau$ seconds. Since the output speed clock 112 operates at a rate fractionally related to the high-speed clock 106 by a factor of K (i.e., clock 112 produces $1/K\tau$ pulses per second), the two-level quantizer 107 operates every $K\tau$ seconds, where K is an integer greater than 1. Thus, every $K\tau$ seconds, the two-level quantizer 107 produces at the output terminal 108 a one or a zero, depending on the state of adder 116. For example, if the signal at terminal 105 is larger than that at terminal 111, the two-level quantizer will produce a one; otherwise, it will produce a zero.

The signals from the two-level quantizer 107 in addition to being transmitted as output signals, are also conveyed to the sequential digital logic 109. This digital logic 109 may be variously embodied, depending upon the precise companding algorithm. For example, the digital logic 109 may be a set of read-only memory registers which accomplish a "table look up" of the available step sizes. On the other hand, logic 109 may be set up to calculate and specify the next accumulator 110 counting increment (hereinafter defined as S) as an arithmetic function of the previous step size (e.g., a multiple of or incremental change from the previous step size). This logic may be synthesized in accordance with the rules taught by N. S. Jayant in his article "Adaptive Delta Modulation With a One Bit Memory," *Bell System Technical Journal*, March 1970, Vol. 49, No. 3.

In any case, the state of the output of the accumulator 110 is determined by the digital logic 109. That is, the logic 109 may determine from a specific code combination from the two-level quantizer 107 to cause accumulator 110 to accomplish certain counting progressions, thereby altering at its output 111 the binary number which is conveyed to the added 116. Thus, in the $K\tau$ second interval between clock 112 pulses, logic 109 may cause accumulator 110 to advance the count at its output by as many as K increments. This may be seen to correspond to a conventional adaptive modulator which has a range of 1 to K integration step sizes.

In summary, the embodiment of FIG. 1 produces at terminal 105 every $\tau$ seconds a binary representation of the state of the analog signal. The accumulator 110 produces at terminal 111 every $K\tau$ seconds a binary representation of the previous analog signals. The adder 116 then takes the difference between these numbers, and this difference is represented every $K\tau$ seconds as an output signal by the two-level quantizer 107 and transmitted via terminal 108.

As was mentioned hereinbefore, the essence of the present invention concerns the utilization of a high-speed linear delta modulator for converting the analog signal to a digitalized version thereof at a high rate in combination with a logical processor (e.g., unit 102 of FIG. 1) which simulates the variable step mechanism of prior art adaptive modulators and generates the desired slower output signal. The first illustrative embodiment of the present invention, shown in FIG. 1, relies on a digital delta modulator as the logical processor to simulate the adaptive step mechanism. Other means, however, may also be advantageously used to simulate the adaptive mechanism of the prior art adaptive delta modulators.

Figure 2:
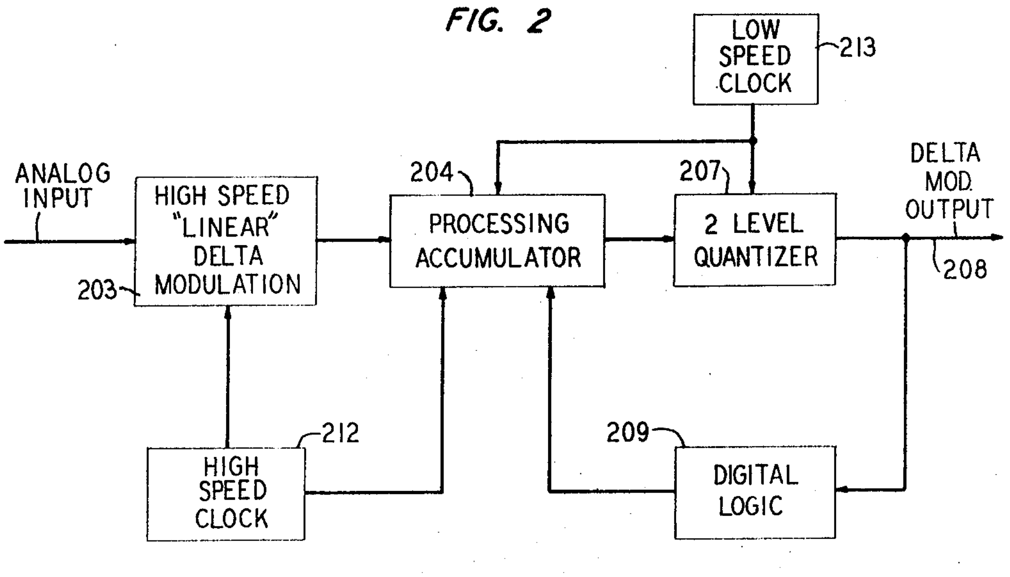
FIG. 2 shows a generalized version of a second illustrative embodiment of the present invention.

FIG. 2 shows a generalized version of a second illustrative embodiment of the present invention, one which utilizes different apparatus than the embodiment of FIG. 1. FIG. 4 shows a third illustrative embodiment of the present invention. The description of FIGS. 2 and 4 reveal that many such alternatives may be utilized to practice the present invention without departing from the intended scope or spirit thereof.

In the embodiment of FIG. 2, the analog input signal is first processed by a high-speed linear delta modulator 203. The modulator 203 of FIG. 2 is structurally and functionally identical to high-speed modulator 103 in FIG. 1. Thus, the signal which appears at the output of the high-speed modulator 203 is composed of a train of ones and zeros representing increases and decreases in the analog input signal. In the embodiment of FIG. 2, the signals from the delta modulator 203 are not conveyed to a delta modulation-to-binary converter; rather, the need for a cumulative delta modulation-to-binary conversion has been eliminated by incorporating three functions and elements into a single unit, designated as a processing accumulator 204. The remainder of the embodiment of FIG. 2 is directly analogous piecemeal to that of FIG. 1. That is, a two-level quantizer 207 produces at an output terminal 208 delta modulation "1's" and "0's" which correspond to changes in the output state of the processing accumulator 204. Digital logic circuitry 209 is connected in feedback from output terminal 208 to the processing accumulator 204. High and low speed clocks 212 and 213 fix the rate of modulator 203 and quantizer 207, respectively.

The operation of the embodiment of FIG. 2 is quite analogous to that of the embodiment of FIG. 1. The only difference in FIG. 2 is the functional consolidation into the processing accumulator 204, which operates as follows. In the embodiment of FIG. 1 the role of the converter 104, adder 116, and accumulator 110 was to provide to the two-level quantizer 107 at each low speed sample instant (i.e., every $K\tau$ seconds) an indication of the current error between the input channel (via high-speed modulator 103) and the feedback channel (via digital logic 109). It is quite feasible to perform this error designating operation in a single unit; in fact, that is just what the processing accumulator 204 does. Accordingly, the processing accumulator 204 stores a single binary number, initially zero, which it increases by one for each "1" received from the high-speed modulator 203 and decreases by one for each "0" received from the modulator 203. In addition, this number is increased or decreased by appropriate counting increments in response to the digital logic 209, similarly to the logic 109 operation in FIG. 1. Thus, by properly operating upon a single binary number, the processing accumulator 204 does away with the necessity of storing two separate binary numbers as does the embodiment of FIG. 1.

For example, the processing accumulator 204 of FIG. 2 may be specifically embodied with the apparatus shown in FIG. 3A. The apparatus of FIG. 3A consists simply of a block of addend logic 221 and an accumulator 222. The interconnections of the processing accumulator 204 with the various apparatus of FIG. 2 are also shown in FIG. 3A.

As pointed out hereinbefore, the processing accumulator 204 functions to store a number representative of the contemporary state of the analog input signal and to vary that stored number in response to signals from modulator 203 and from digital logic 209. In the embodiment of FIG. 3A, the accumulator 222 performs the function of storage of the number. In particular, the accumulator 222 is identical in structure and function to the accumulator 110 of FIG. 1. The addend logic 221 of FIG. 3A performs the function of changing the number stored in accumulator 222 in response to signals from the modulator 203 and logic 209.

The operation of addend logic 221 may be readily understood by considering FIG. 3B, a state table which describes in particular the addend logic 221 operation. Addend logic 221 operates upon data from three sources (modulator 203, logic 209 and clock 213); all possible values from these sources are shown in the first three columns of FIG. 3B. The corresponding outputs delivered from logic 221 to accumulator 222 are shown in column 4 of FIG. 3B. It is noteworthy that logic 209 effectively produces two quantities: the counting increment, defined as $s$, which it normally generates, and the previous output digit, which it stores in order to calculate the counting increment, $s$. Thus, depending upon whether a pulse or no pulse is received from clock 213, a "0" or a "1" is received from modulator 203, and a "0" or a "1" previous output digit value is received from logic 209, the addend logic produces a unique output to vary the number stored in accumulator 222. Clearly, the various changes produced by addend logic (e.g., +1, − 1, $-s-1$, etc.) correspond functionally to the operations of accumulator 110, converter 105 and adder 116 of FIG. 1.

By utilizing the state table of FIG. 3B, addend logic 221 may be conventionally synthesized using the well-known elementary rules of digital logic synthesis. Moreover, a number of other representations for the processing accumulator 204 may be devised by those skilled in the art while still performing the operations contemplated in the present invention for the processing accumulator 204. The remainder of the embodiment of FIG. 2 is completely analogous to the embodiment of FIG. 1.

FIG. 4 shows a third illustrative embodiment of the present invention. In the embodiment of FIG. 4, high-speed delta modulator 303, the two-level quantizer 307 and the digital logic 309 are directly identical to the modulator 203, quantizer 207 and logic 209, respectively, in the embodiment of FIG. 2. Instead of the processing accumulator 204, the embodiment of FIG. 4 utilizes a one-way counter 321, an adder 322 and an accumulator 323. The accumulator 323 may be synthesized in accordance with the IEEE article by Jackson, Kaiser, and McDonald, referenced hereinbefore. For timing purposes, two clocks are once more provided, a high-speed clock 306 and a low output-speed clock 312. The high-speed clock 306 drives the modulator 303 and the counter 321 whereas the low speed clock 312 drives the reset of counter 321, the adder 322, the accumulator 323 and the two-level quantizer 307.

The embodiment of FIG. 4 operates as follows. First, the analog input signal is converted to a train of ones and zeros by delta modulator 303 under the control of high-speed clock 306. This train of ones and zeros, occurring at rate $1/\tau$ drives a one-way counter 321. That is, the one-way counter 321 increases its count for each "1" received from the high-speed modulator 303 and disregards the "0's." In addition, however, the low speed clock 312, pulsing at the output rate $1/K\tau$ is connected to the reset terminal of the one-way counter. Thus, while the count at the output of the one-way counter 321 may increase at the rate $1/\tau$, it is reset back to a reference level every $K\tau$ seconds. Therefore, presented to the adder 322 from counter 321 every $K\tau$ seconds is a count of the net change in the analog signal in the past $K\tau$ seconds. At the negative input of adder 322, the digital logic 309 presents a signal which represents the applicable count, or "step size," as calculated from prior signals at terminal 308. At the end of the sample interval, the low speed clock 312 pulses the adder 322 causing it to add the counter output count to the negative of the applicable step size. The positive or negative differential from the addition causes the accumulator 323 to increase or decrease its stored amount by the amount of the differential. The two-level quantizer 307 then proceeds to encode the accumulator output at the output rate under the control of the low speed clock 312.

Since each of the embodiments herein described has relied upon a two-level quantizer (i.e., 107 in FIG. 1, 207 in FIG. 2, and 307 in FIG. 4), a brief word on embodying it is appropriate. Although a great variety of apparatus is available which may produce a two-level quantization process, one may be provided as simply as a single input bistable circuit followed by a differentiating circuit for generating pulses. The bistable circuit samples the sign bit presented at its input by means of the clock, with a positive or negative transition being applied to the differentiator each time a "+" or a "−" is received at the bistable device input.

The foregoing embodiments have been intended merely to be illustrative of the principles of the present invention. It is apparent that other embodiments may readily occur to those skilled in the art without departing from the intended spirit and scope of the invention.

What is claimed is:

1. An adaptive modulator, comprising in combination, first delta modulation means operating at a high fixed rate and with a fixed increment size, conversion means for periodically representing the signals from said first delta modulation means as a binary number, and second delta modulation means responsive to said conversion means and operating at a rate fractionally related to said fixed rate, said second delta modulation means including feedback means for digitally varying the increment size of said second delta modulation means.

2. An adaptive modulator for representing an analog signal as a binary signal, the digits of said binary signal occuring at a specified output rate, comprising means for converting the analog signal to a digital number, said converting means sampling the analog signal at a rate which is a multiple of the output rate, the digital representation of a particular sample being dependent on said particular sample and upon at least one prior sample, and modulation means responsive to said conversion means for producing said binary signal, said modulation means including a digital feedback circuit for adaptively estimating the change occurring in said analog signal between digits of said binary signal.

3. An adaptive modulator as defined in claim 2 wherein said means for converting the analog signal comprises a linear delta modulator operating at a rate which is a multiple of the output rate, and means for counting the signals from said linear delta modulator and representing the count as a multilevel number.

4. An adaptive modulator as defined in claim 2 wherein said modulation means comprises a digital delta modulator including a digital accumulator, means for digitally comparing the output of said accumulator with the output of said conversion means, a quantizer for digitally representing the results from said comparing means, and digital logic responsive to said quantizer for varying the counting sequence utilized by said accumulator.

5. An adaptive modulator as claimed in claim 2 wherein said means for converting the analog signal to a binary number comprises a linear delta modulator operating at a rate which is a multiple of said output rate, and one-way counting means responsive to said linear delta modulator which resets its count to a reference level at said output rate, whereby said means for converting the analog signal produces an approximation of the net change in said analog signal between digits of said binary signal.

6. An adaptive modulator as claimed in claim 2 wherein said modulation means comprises, digital logic means responsive to said binary signal for dynamically estimating at said output rate the changes in said analog signal, means for adding said digital number to the negative of the estimated change from said digital logic, a digital accumulator for cumulatively storing the sum from said adding means, and quantizing means responsive to the polarity of the cumulative sum stored by said digital accumulator for generating said output signal.

7. An adaptive modulator for representing an analog signal as a binary signal, the digits of said binary signal occurring at a specified output rate comprising, a linear delta modulator operating at a rate which is a multiple of said output rate, digital logic means responsive to said binary signal for dynamically estimating at said output rate the changes in said analog signal, memory means for producing and storing a multilevel number representative of an approximation of the contemporaneous value of said analog signal, said memory means increasing or decreasing said multilevel number in response to said linear delta modulator and to said digital logic means, and quantizing means responsive to the polarity of said multilevel number for generating said output signal.

* * * * *